United States Patent
Scala

(10) Patent No.: US 8,100,677 B2
(45) Date of Patent: Jan. 24, 2012

(54) VACUUM CONTAINER FOR A TYRE CURING MOLD

(75) Inventor: Pierpaolo Scala, Rome (IT)

(73) Assignee: Bridgestone Corporation, Tokyo (JP)

( * ) Notice: Subject to any disclaimer, the term of this patent is extended or adjusted under 35 U.S.C. 154(b) by 64 days.

(21) Appl. No.: 12/452,359

(22) PCT Filed: Jun. 28, 2007

(86) PCT No.: PCT/IT2007/000466
§ 371 (c)(1),
(2), (4) Date: Mar. 18, 2010

(87) PCT Pub. No.: WO2009/001386
PCT Pub. Date: Dec. 31, 2008

(65) Prior Publication Data
US 2010/0193134 A1 Aug. 5, 2010

(51) Int. Cl.
*B29D 30/06* (2006.01)
(52) U.S. Cl. .......................... 425/28.1; 425/46; 425/47
(58) Field of Classification Search ................ 425/28.1, 425/35, 46, 47
See application file for complete search history.

(56) References Cited

U.S. PATENT DOCUMENTS

| | | | |
|---|---|---|---|
| 5,145,688 A | 9/1992 | Ohtake | |
| 5,585,064 A * | 12/1996 | Moris-Herbeuval et al. | ... 425/47 |
| 7,056,109 B2 * | 6/2006 | Kata | .............. 425/46 |
| 2006/0119006 A1 | 6/2006 | Cantu' et al. | |

FOREIGN PATENT DOCUMENTS

| | | |
|---|---|---|
| EP | 0 701 894 A2 | 3/1996 |
| EP | 1 495 848 A1 | 1/2005 |
| JP | A-63-67114 | 3/1988 |
| WO | WO 2004/009337 A1 | 1/2004 |

OTHER PUBLICATIONS

International Search Report for International Application No. PCT/IT2007/000466, issued Mar. 12, 2008.
Written Opinion of the International Searching Authority for International Application No. PCT/IT2007/000466, issued Mar. 12, 2008.
International Preliminary Report on Patentability for International Application No. PCT/IT2007/000466, issued May 26, 2009.

* cited by examiner

*Primary Examiner* — James Mackey
(74) *Attorney, Agent, or Firm* — Oliff & Berridge, PLC

(57) ABSTRACT

A vacuum container for a tyre curing mold having two sidewalls and a number of lateral sectors; the container having an inclined-surface actuating device, which moves the lateral sectors radially, is activated by a press having a movable plate with a central airtight chamber, and has, for each lateral sector, a wedge integral with the lateral sector, and a conical bell fitted in sliding manner to the wedges; and the container having: an air shut-off plate integral with the movable plate of the press to transmit motion to the conical bell; an adjusting ring integral with the air shut-off plate and the conical bell; a static first annular seal interposed between the conical bell and the adjusting ring; and a static second annular seal interposed between the air shut-off plate and the movable plate of the press.

9 Claims, 1 Drawing Sheet

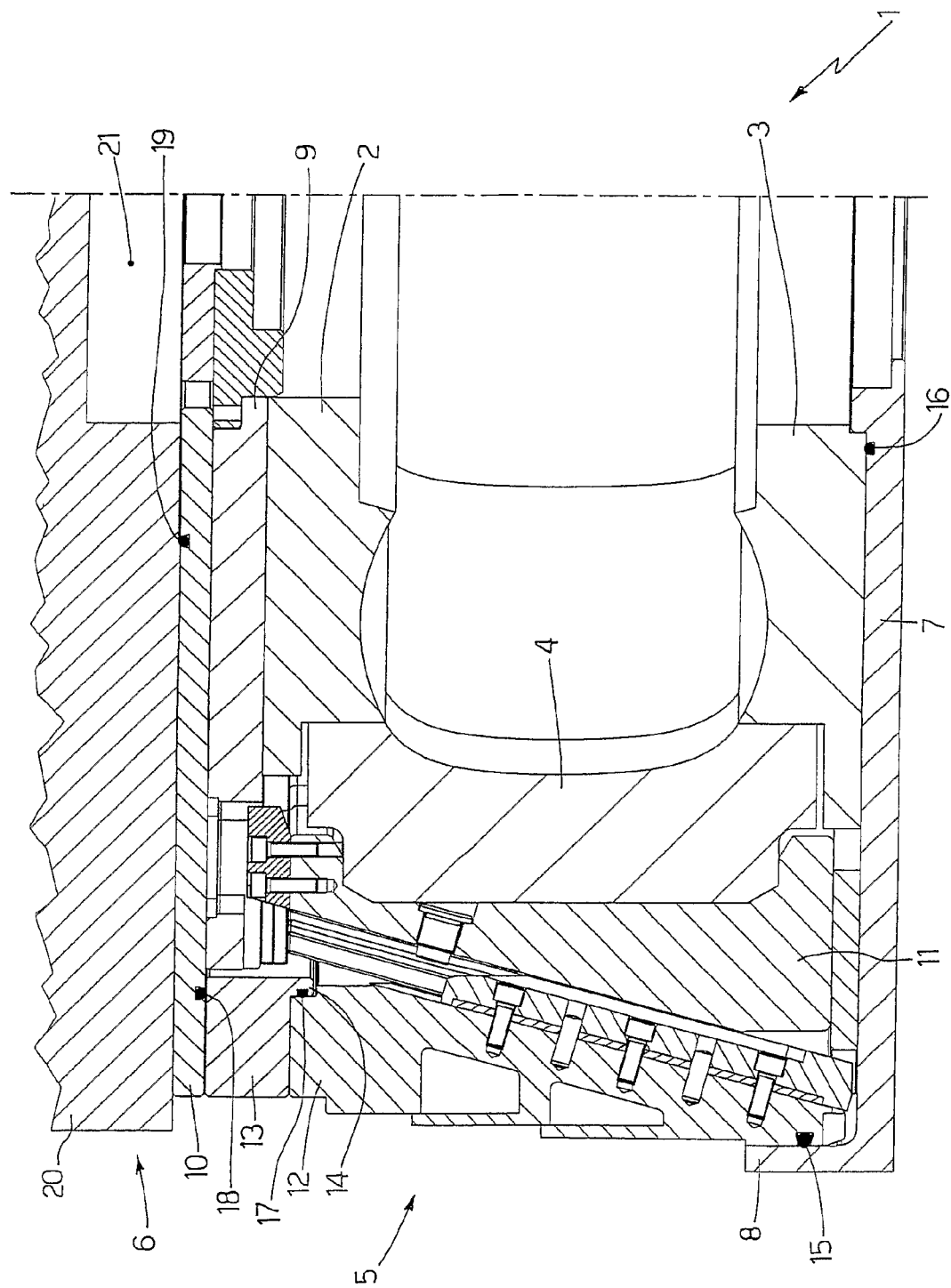

VACUUM CONTAINER FOR A TYRE CURING MOLD

TECHNICAL FIELD

The present invention relates to a vacuum container for a tyre curing mold.

BACKGROUND ART

A tyre curing mold is in the form of a hollow cylinder, and comprises two flat, circular, parallel, opposite sidewalls defining the top and bottom walls of the mold; and a number of lateral sectors arranged successively to define the cylindrical lateral wall of the mold.

To insert a green tyre inside the mold and remove the cured tyre from the mold, the lateral sectors are movable radially to and from an engaged position, in which the lateral sectors contact the sidewalls.

In actual use, a tyre curing mold is inserted inside a container designed to hold the component parts (lateral sectors and sidewalls) of the curing mold together during the curing operation, and to permit release of the component parts of the curing mold to insert a green tyre and remove the cured tyre. The container normally comprises a system of inclined surfaces activated by a press to move the lateral sectors radially with respect to the sidewalls. This solution is adopted in that it provides for gripping the lateral sectors against the sidewalls with sufficient force to counteract the pressure (normally at least 20 bars) produced inside the mold during the curing operation.

One example of a tyre curing mold and container is described in Patent Application WO2004009337A1.

A vacuum container for a curing mold has been proposed, in which, once the green tyre is inserted, the container is connected to a vacuum pump to produce a vacuum inside the container (and therefore inside the curing mold) to improve fill of the curing mold by the green tyre and prevent the formation of air pockets. One example of a vacuum container for a curing mold is described in Patent EP0701894B2.

The vacuum container in Patent EP0701894B2, however, has several drawbacks, by comprising two dynamic, i.e. sliding, annular seals (O-rings), which are subject to severe wear, caused by a combination of pressure and the sliding movement of the seals, and must therefore be changed frequently, thus resulting in high maintenance cost of the vacuum container.

DISCLOSURE OF THE INVENTION

It is an object of the present invention to provide a vacuum container for a tyre curing mold, designed to eliminate the aforementioned drawbacks, and which, in particular, is cheap and easy to produce.

According to the present invention, there is provided a vacuum container for a tyre curing mold, as claimed in the accompanying Claims.

BRIEF DESCRIPTION OF THE DRAWING

A non-limiting embodiment of the present invention will be described by way of example with reference to the attached drawing, which shows a lateral half-section of a vacuum container for a tyre curing mold, in accordance with the present invention.

PREFERRED EMBODIMENTS OF THE INVENTION

Number 1 in the attached drawing indicates as a whole a vacuum container for a tyre curing mold.

A curing mold is in the form of a hollow cylinder, and comprises two (respectively, top and bottom) sidewalls 2 and 3, which are parallel and face each other, define the top and bottom walls of the curing mold, and have respective inner retaining surfaces contacting a tyre housed inside the curing mold. The curing mold also comprises a number of (normally 8 or 9) lateral sectors 4 (only one shown in the drawing) arranged successively to form the cylindrical lateral wall of the mold, and movable radially to and from the two sidewalls 2 and 3.

Container 1 is designed to hold the component parts (lateral sectors 4 and sidewalls 2 and 3) of the curing mold together during the curing operation, and to permit release of the component parts of the curing mold to insert a green tyre and remove the cured tyre, and comprises an inclined-surface actuating device 5 activated by a press 6 (shown schematically) to move lateral sectors 4 radially with respect to sidewalls 2 and 3. This solution is adopted in that it provides for gripping lateral sectors 4 against sidewalls 2 and 3 with sufficient force to counteract the pressure (normally at least 20 bars) produced inside the curing mold during the curing operation.

Container 1 comprises a circular bottom plate 7 housing bottom sidewall 3 and having an annular outer edge 8; and a top plate 9, which is fixed to top sidewall 2 and rests at the top against an air shut-off plate 10 connected to press 6 to move vertically and transmit its movement to actuating device 5.

Actuating device 5 comprises, for each lateral sector 4, a wedge 11 integral with lateral sector 4; and a conical bell 12 connected in sliding manner to wedges 11 by a dovetail coupling, and which is given motion by air shut-off plate 10. Air shut-off plate 10 has an adjusting ring 13 fitted integrally by a number of screws to both air shut-off plate 10 and conical bell 12, so that air shut-off plate 10, when raised or lowered by press 6, transmits the same movement to conical bell 12, which is integral with air shut-off plate 10 via the interposition of adjusting ring 13. In a preferred embodiment, adjusting ring 13 has an edge 14 resting on an inner lateral surface of conical bell 12.

To make container 1 airtight, a dynamic annular seal (O-ring) 15 is housed in an annular seat formed in the outer lateral surface of conical bell 12 and interposed between conical bell 12 and annular outer edge 8 of bottom plate 7. In actual use, when moved vertically to tighten or loosen lateral sectors 4, conical bell 12 slides vertically with respect to annular outer edge 8.

To make container 1 airtight, a static annular seal (O-ring) 16 is housed in an annular seat formed in the top surface of bottom plate 7 and interposed between bottom sidewall 3 and bottom plate 7. In actual use, bottom plate 7 and bottom sidewall 3 being integral with each other, annular seal 16 is subjected to no sliding movement.

To make container 1 airtight, a static annular seal (O-ring) 17 is housed in an annular seat formed in the outer lateral surface of edge 14 of adjusting ring 13 and interposed between conical bell 12 and edge 14 of adjusting ring 13. In actual use, conical bell 12 and adjusting ring 13 being integral with each other, annular seal 17 is subjected to no sliding movement.

To make container 1 airtight, a static annular seal (O-ring) 18 is housed in an annular seat formed in the bottom surface of air shut-off plate 10 and interposed between air shut-off plate 10 and adjusting ring 13. In actual use, air shut-off plate 10 and adjusting ring 13 being integral with each other, annular seal 18 is subjected to no sliding movement.

Finally, to make container 1 airtight, a static annular seal (O-ring) 19 is housed in an annular seat formed in the top surface of air shut-off plate 10 and interposed between air shut-off plate 10 and a movable plate 20 of press 6, which is fitted integrally to air shut-off plate 10 by a number of screws. In actual use, air shut-off plate 10 and movable plate 20 being integral with each other, annular seal 19 is subjected to no sliding movement.

An airtight chamber 21 is formed in the central portion of movable plate 20 of press 6, and communicates pneumatically with the inner seat of the curing mold. Chamber 21 of press 6 being airtight, a vacuum can be formed and maintained inside container 1 (and therefore inside the curing mold).

To form and maintain a vacuum inside container 1 (and therefore inside the curing mold), container 1 is connected to a vacuum pump (not shown) by an intake conduit (not shown) located at bottom plate 7.

Vacuum container 1 as described is cheap and easy to produce; comprises only one dynamic seal: annular seal 15 interposed between conical bell 12 and annular outer edge 8 of bottom plate 7; and is therefore easier and cheaper to maintain as compared with known vacuum containers.

Moreover, vacuum container 1 as described has the same design as conventional, currently used containers, which can therefore be converted quickly, easily and cheaply.

The invention claimed is:

1. A vacuum container for a tyre curing mold;
   the curing mold being in the form of a hollow cylinder, and comprising two parallel facing top and bottom sidewalls defining top and bottom walls of the curing mold; and a number of lateral sectors arranged successively to define a cylindrical lateral wall of the curing mold, and which are movable radially to and from the two sidewalls;
   the container comprising:
   an inclined-surface actuating device, which moves the lateral sectors radially, is activated by a press having a movable plate, and comprises, for each lateral sector, a wedge integral with the lateral sector, and a conical bell fitted in sliding manner to the wedges;
   an air shut-off plate interposed between the movable plate of the press and the conical bell to transmit motion to the conical bell; and
   an adjusting ring integral with the air shut-off plate;
   wherein:
   the movable plate of the press is provided with a central airtight chamber;
   the air shut-off plate is integral with the movable plate of the press to transmit motion to the conical bell;
   the adjusting ring is integral, on one side, with the air shut-off plate and, on the other side, with the conical bell;
   a static first annular seal is interposed between the conical bell and the adjusting ring; and
   a static second annular seal is interposed between the air shut-off plate and the movable plate of the press.

2. A container as claimed in claim 1, wherein the static second annular seal is housed in an annular seat formed in the top surface of the air shut-off plate and interposed between the air shut-off plate and the movable plate of the press.

3. A container as claimed in claim 1, and comprising a static third annular seal interposed between the air shut-off plate and the adjusting ring.

4. A container as claimed in claim 3, wherein the adjusting ring has an edge resting on an inner lateral surface of the conical bell.

5. A container as claimed in claim 4, wherein the first annular seal is interposed between the conical bell and the edge of the adjusting ring.

6. A container as claimed in claim 5, wherein the first annular seal is housed in an annular seat formed in an outer lateral surface of the edge of the adjusting ring and interposed between the conical bell and the edge of the adjusting ring.

7. A container as claimed in claim 1, and comprising a top plate, which, on one side, is fixed to the top sidewall, and, on the opposite side, rests on the air shut-off plate.

8. A container as claimed in claim 1, and comprising a circular bottom plate, which houses the bottom sidewall, and has an annular outer edge; and a dynamic fourth annular seal interposed between the conical bell and the annular outer edge of the bottom plate.

9. A container as claimed in claim 8, and comprising a static fifth annular seal interposed between the bottom sidewall and the bottom plate.

* * * * *